United States Patent [19]
Liepa et al.

[11] 3,846,568
[45] Nov. 5, 1974

[54] PREPARATION OF MEAT FLAVOR CONCENTRATES FROM HEAT-TREATED SLURRIED MEAT, WATER, AND ASCORBIC ACID

[75] Inventors: Alexander Leon Liepa, Cincinnati; David Evans O'Connor, Greenhills, both of Ohio

[73] Assignee: The Procter & Gamble Company, Cincinnati, Ohio

[22] Filed: May 1, 1972

[21] Appl. No.: 248,993

[52] U.S. Cl................ 426/364, 426/65, 426/212
[51] Int. Cl............................................. A23l 1/26
[58] Field of Search............ 426/212, 65, 175, 221, 426/364, 371, 372, 373

[56] References Cited
UNITED STATES PATENTS
3,157,516  11/1964  Huber et al........................... 426/65

Primary Examiner—Raymond N. Jones
Assistant Examiner—Esther L. Massung

[57] ABSTRACT

This invention relates to the preparation of artificial flavoring concentrates by forming a slurry containing water, ascorbic acid, and a cooked, comminuted natural animal or vegetable protein followed by heating the slurry in a closed container at an elevated temperature.

10 Claims, No Drawings

PREPARATION OF MEAT FLAVOR CONCENTRATES FROM HEAT-TREATED SLURRIED MEAT, WATER, AND ASCORBIC ACID

BACKGROUND OF THE INVENTION

Various meat analogs have recently been prepared from edible protein sources, i.e., soybeans and cottonseed. A recent example of this is preparing fibrous meat products from protein such as soy protein, forming a coherent workable protein emulsion in dough form; preparing a sheet from the dough which may subsequently be shredded to form fiber-like strands. The strands are aggregated into a desired fiber alignment, coated with an edible binder material, and stabilized to form a coherent fiber mass which closely resembles meat in appearance, texture, and eating quality. For further details on this process see co-pending case, Ser. No. 100,549 entitled "An Improved Meat Analog," filed Dec. 21, 1970. In order that the above-described product and other related meat analogs simulate meat not only as to texture, appearance, and eating quality, but also to flavor, aroma, and color, various flavoring agents and dyes are added thereto. Many flavoring agents used heretofore are unsatisfactory and do not adequately give meat analogs the desired flavors. The term flavor as used herein is intended to be generic to both the flavor and aroma of a specific flavor concentrate.

Interest in the substances responsible for the flavor of cooked foods, especially in the substances responsible for the flavor of cooked meat, has been evident for some time. Nevertheless, the approaches heretofore employed have not given rise to results of any substantial practical significance. One frequently employed technique is capturing the highly fugitive flavor essence from cooking meat. This approach has met with only limited success because of a number of factors, including the comparatively low concentration in which the flavor essences are found and the instability of the mixture of substances which make up the essence.

A commercial meat extract is generally obtained by extraction of the meat with water, for example beef. This is followed by evaporation of the greater portion of the water resulting in a brown final extract product containing 14–25 percent moisture. This commercial meat extract is expensive and the processing is very time consuming. Results of addition to foodstuffs have shown tendencies to develop undesirable offtastes and a dark color.

Another commonly employed approach involves isolation and chemical identification of the flavor components followed by attempts at synthesizing the identified material. The manifest difficulties of isolating the components of natural cooked food flavor essences seriously complicate their identification. Even where one or more components have been identified and synthesized, the resulting formulated essences have proved to be coarse and unnatural because they lack the numerous minor constituents which finish and round out the bouquet of primary components, adding keynote aromas and overtones.

More recently, efforts have been devoted to extracting flavor precursors from foods prior to their processing and add-back in order to avoid subjecting the flavor precursors to the degradating effects of the preserving methods. However, these efforts have not resulted in the development of true, freshly cooked food flavors, especially in the case of meats.

Other attempts which have resulted in less than satisfactory meat flavor concentrates involve the use of dilute mineral acids, extraction solvents or combinations thereof. Sample patents teaching the use of solvents to extract protein or meat flavors are: Turner, U.S. Pat. No. 3,010,829, issued Nov. 28, 1961 (Mineral Acid Hydrolysis to Remove Meat Flavors), and Landmann et al., U.S. Pat. No. 3,047,399, issued July 31, 1962 (Use of Cold Water to Extract Meat Flavors). Additional, but distinct, prior art is provided by Huber et al., Pat. No. 3,157,516, issued Nov. 17, 1964, which teaches the combination of ascorbic or isoascorbic acid and cysteine to form flavor and aroma characteristics reminiscent of chicken, turkey, and/or tuna.

Accordingly, it is an object of the present invention to provide novel flavoring concentrates.

Another object of the invention is to provide an improved meat analog containing the novel artificial flavoring concentrates.

A further object of the invention is to provide a meat analog with improved meat flavor.

An additional object of the invention is to provide a novel flavoring concentrate which additionally acts as a nutritional supplement for meat analog products.

The method of accomplishing these and other objects will become apparent from the following description of the invention.

SUMMARY OF THE INVENTION

This invention comprises comminuting a natural animal or vegetable protein source into particles. The particles are then formed into a slurry using a 0.1 to 2 percent solution of ascorbic acid based on the weight of the water and protein source. The resulting slurry is heated in a closed container at an elevated temperature until all browning and cooking reactions are completed. The liquid portion of the slurry can then be added to food analogs in varying concentrations. This imparts a desirable flavor to the food analog, while at the same time providing a nutritional supplement.

DETAILED DESCRIPTION OF THE INVENTION

It has been discovered that artificial flavoring concentrates having the flavor and aroma characteristics of natural protein products can be prepared by the reaction of ascorbic acid, water, and, for example, comminuted ground raw meat. Such flavoring substances can be used to impart meat flavor into food products containing no natural meat and in addition, can be used to intensify the flavor of natural meat products. This invention is not limited in scope of application to meat products, but rather includes any suitable animal or vegetable protein source from which flavors can be isolated. For purposes of this application the term "protein source" is intended to be generic to any suitable animal or vegetable protein sources.

L-ascorbic acid is a 6-carbon compound and a water-soluble vitamin also known as vitamin C (for cervitamic acid) that exists in both the reduced and the oxidized form in nature. It is found in all living tissue. L-ascorbic acid, added to particular media, lowers the oxidation potential. This accounts for its substantial use as a preservative of foods and food color. The lowering of the oxidation potential frequently protects other sensitive oxidizable compounds present, by preferential oxidation of ascorbic acid.

The use of ascorbic acid as a preservative is well known. However, the use of ascorbic acid to form a flavor concentrate is not disclosed by the prior art. It is thought that the unique advantage of using ascorbic acid in the process disclosed by this invention is the ability of ascorbic acid to intensify the natural meat flavor obtained from the ground meat, water, and ascorbic acid slurry. In addition, it is theorized that browning reactions occur between the ascorbic acid and flavor precursors resulting in the formation of new flavors. When ascorbic acid is added to water in concentrations of 0.1 to 2 percent and the resulting solution is added to finely ground meat, the meat flavor is intensified by the ascorbic acid and new and better flavor concentrates result. Likewise, the other available isomers and salts of ascorbic acid have been found to be viable flavor intensification agents. The most common isomers of ascorbic acid are L-ascorbic acid, isoascorbic acid, and dehydroascorbic acid, although any other available isomers are likewise useful. The most common salts of ascorbic acid are the sodium and potassium salts. Therefore, in the interest of brevity the term ascorbic acid as used in this patent application is intended to be generic to ascorbic acid, ascorbic acid isomers, and ascorbic acid salts.

In the flavor concentration process of this invention, ascorbic acid in solution participates directly in the chemical reaction leading to intense flavors. Stated differently, ascorbic acid provides the chemical mechanism which intensifies the protein flavors in the slurried solutions in addition to reacting with flavor precursors to form new flavors. This differs significantly from previous attempts to form flavor concentrates in that the ascorbic acid does not act as an extracting agent, but acts as an intensification agent. In its capacity as an intensification agent the ascorbic acid causes the natural flavors derived from the protein source to be magnified so that they stimulate a strong flavor sensation when placed in a food analog and eaten. At the same time ascorbic acid reacts with flavor precursors to yield browning reaction products which results in the formation of distinct but related new flavor components.

A preferred embodiment of this invention is the use of the process of this invention to extract natural flavors from meats and then adding the flavors to the appropriate corresponding meat analog. The meats employed in this process are any known edible meats especially including those meats normally wasted in disposing of an animal carcass. Beef, pork, poultry, mutton, and the like, are typical examples of meats which may be used. Various cuts of meats may be employed including the full carcass, or special economy cuts, such as head meats, cheek meats, shank meats, heart meats, and the like. The type and cut of meat may be varied to give the desired meat flavor, concentration and quality.

Basically, this invention comprises forming a slurry from a comminuted natural protein source and a 0.1 to 2 percent solution of ascorbic acid in water. The 0.1 to 2.0 percent concentration range refers to percentage by weight of the wet natural protein source. The resulting slurry is heated in a closed container at an elevated temperature until all browning and cooking reactions are completed. The time, temperature, and pressure must be varied depending on the particular protein source. The solids, which after cooling have the consistency of paste, are then filtered from the slurry and the remaining liquid is used as a flavor concentrate to be added to foods in concentrations of 1 to 5 percent.

It is desirable that the concentration of ascorbic acid be kept between about 0.1 and about 2 percent and preferably between 0.3 and 1.0 percent. At levels below 0.1 percent the necessary intensification reactions do not occur and a satisfactory flavor concentrate cannot be formed. At concentrations significantly above 2 percent undesirable burnt notes and other off-flavors and after-tastes are noticed.

The process of this invention is comprised more specifically of placing comminuted natural protein particles in a closed container and extracting said protein particles with water while at the same time intensifying said extract flavors with a 0.1 to 2.0 percent ascorbic acid solution. The water extraction process is a conventional technique. The amount of water added is not critical and can vary from merely the use of the water naturally present in protein (approximately 40-60 percent by weight of the protein) up to the addition of 5 parts of water for every 1 part of protein. An especially preferred range is 2 parts protein to 1 part water to 1 part protein to 2 parts water. The protein source itself may be raw or cooked depending on the particular protein source and the particular desired end product. The particular size of the protein particles is not critical. Logically, the smaller the meat particles, assuming meat is the protein source, the more easily the meat flavors may be extracted from them as the more surface area that will be available; but the actual size is not important. The important consideration is that the protein source must be comminuted to a size small enough to allow the extraction and intensification steps of this invention to be conveniently accomplished. As mentioned previously, present in the water-protein source slurry is a 0.1 to 2.0 ascorbic acid solution which acts to intensify the natural flavors as they are extracted by the water, under the conditions of heat, temperature, and pressure used.

In adding ascorbic acid to the protein-water slurry it is necessary to note that most protein materials contain a natural content of ascorbic acid. However, it must be pointed out that the natural ascorbic acid content of protein is so small that it is considered insignificant. Surprisingly, it was found that despite the natural ascorbic acid content of protein the addition of ascorbic acid in the range of 0.1 to 2.0 percent caused the unique intensification process which forms an integral part of the practice of this invention. Therefore, the natural ascorbic acid present in the protein source will not add significantly to the ascorbic acid percentage concentration added to the slurry during the practice of this invention.

The most critical variable in the entire process is the amount of ascorbic acid added. It has been experimentally determined that the range of 0.1 to 2.0 percent based on the wet weight of the meat or other protein source accurately reflects the limits of ascorbic acid addition. A preferred range is 0.3 to 1.0 percent, once again based on the wet weight of the meat or other protein source. As mentioned previously, amounts less than 0.1 percent have been found insufficient to cause the necessary intensification reactions and amounts greater than 2.0 percent have been shown to leave an excess of undesirable burnt flavor notes in the final product.

The slurry is then placed in a closed container and cooked. The closed container may be any of a variety of said containers readily available on the commercial market. The actual cooking of the slurry takes place under regulated conditions of temperature, time and pressure.

The cooking temperatures will normally range from 200°F to 400°F with a preferred range being 250°F to 350°F. These temperatures may be varied according to the time of cooking or browning and additionally may be varied depending on the final product desired. Generally the higher the temperature and longer the cooking time the darker the color and the more burnt notes present in the final flavorful product. Times normally range from 30 seconds to 5 hours depending specifically on the type of meat being cooked, the cut of meat being cooked, the desired end product, the amount of water and ascorbic acid present, and finally the temperature of the cooking.

The pressure maintained in the slurried system while cooking is likewise dependent on the temperature and time. Specifically, the pressure must be maintained so that all the water in the system remains in the liquid phase at the specific temperature employed. Therefore the higher the cooking temperature the higher the pressure that must be maintained. As seen from the above description the variable conditions of time, temperature, and pressure, while important to the successful completion of this invention, are not critical.

After the slurry has been properly cooked and/or browned it should be removed and tested for pH. Specifically, the final flavoring product of this invention must have a pH in the range of 4.5 to 8. A preferred pH range is 5.5 to 7.0. Normally the slurry will be in the pH range of 5 to 7 upon removal from the heating steps. However, as is sometimes the case, the pH may have slipped below 5 due to the addition of ascorbic acid which is a reasonably strong, although nontoxic organic acid. If in fact this does happen it is necessary to add a base to the solution so that the final product will once again have a pH in the range of 5 to 7. The most effective and most economical bases for such use are food grade sodium hydroxide or potassium hydroxide which are readily available commercially. Other food grade bases such as food grade calcium hydroxide can be used. These bases may be added in any convenient form (solid or liquid) and in an amount sufficient to establish the desired pH. Neither of these bases has any effect either positive or negative on the taste of the final product.

After the pH has been adjusted to the desired range the liquid and solid (paste) phases are separated. The solid phase may be kept for future processing into meat products. The liquid phase, however, contains the meat flavors and essences in extremely concentrated forms. It is, therefore, necessary to dilute the liquid phase with water to concentrations of from 1 part concentrate to 10 parts water, to 1 part concentrate to 100 parts water, depending on the particular meat analog sought to be supplemented. The liquid concentrate is then in final form and ready for addition to the meat analog in concentrations of from 1 to 5 percent.

Example 1

Three samples were prepared using ground raw beef, water, and L-ascorbic acid. The weight concentrations of each ingredient is expressed in Table I in addition to the percentage L-ascorbic acid on a wet basis, i.e., water plus protein source material.

TABLE I

|  | Sample | | |
| --- | --- | --- | --- |
|  | I | II | III |
| Ground raw beef | 150 g. | 150 g. | 150 g. |
| Water | 45 g. | 45 g. | 45 g. |
| L-ascorbic acid | .754 g. | 1.508 g. | 3.016 g. |
| Percent acid | .5% | 1.0% | 2.0% |

It should be noted here that the water to raw beef ratio was approximately 1:3 and thus specifically within the disclosed range. The meat was ground in a Hobart meat grinder, and blended in a Waring blender until a paste was obtained. The meat paste, water, and L-ascorbic acid samples were then placed in individual stainless steel nipples which were capped at both ends. The enclosed samples were then cooked at 350°F for 5 hours.

At the end of this time the samples were removed from the nipples. All samples were dark brown in color and consisted of a liquid and solid phase in addition to a fat layer. The samples were then tested for pH and all were found to fall within the disclosed range of 5 to 7. The samples all had a beef aroma and a burnt note in the flavor. Sample III had the strongest aroma and flavor. All samples tasted acidic and burnt.

Sample III (liquid portion) was diluted to approximately 1 part concentrate to 20 parts water, 1 part concentrate to 50 parts water, and 1 part concentrate to 100 parts water. Each additional dilution resulted in a diminished beef flavor intensity, but all dilutions exhibited a distinct beef flavor and aroma. It was estimated that the one part concentrate to 50 parts water would be correct for addition to synthetic meat products in concentrations of about 1 to about 5 percent.

Example II

Three samples are prepared according to the identical conditions as in Example 1 with the one exception that isoascorbic acid is substituted for L-ascorbic acid. Identical results are obtained as were observed in Example I.

Example III

Three samples are prepared according to the identical conditions as in Example I with the one exception that a vegetable protein is used as source material. Specifically, peanuts are processed according to the process of Example I. Identical results as those observed in Examples I and II are found when the peanut flavoring concentrate is added to food analogs in that a highly desirable peanut flavor is imparted to the food analog.

Example IV

Three samples are prepared according to the identical conditions as in Example I with the one exception that no water is added to the slurry. The only water present is that supplied by the meat source which naturally consists of approximately 40 to 60 percent water. Identical results are obtained as were observed in Example I.

Example V

Three samples are prepared according to the identical conditions as in Example I with the one exception that the cooking temperature is 280°F and the cooking time correspondingly is four hours. Identical results are obtained as were observed in Example I.

Example VI

Three samples are prepared according to the identical conditions as in Example I with the single exception that dehydroascorbic acid is substituted for L-ascorbic acid. Identical results are obtained as were observed in Example I.

Example VII

Three samples are prepared according to the identical conditions as in Example I with the single exception that the sodium salt of ascorbic acid is substituted for L-ascorbic acid. Identical results are obtained as were observed in Example I.

We claim:

1. A process of preparing a meat analog flavoring substance comprising
   a. comminuting any natural meat source to provide finely divided particles;
   b. forming a slurry comprising the finely ground meat source of step (a), from 0.1 to 2.0 percent ascorbic acid and water in an amount corresponding to the range of from no added water to about 5 parts water to 1 part protein source,
   c. heating the slurry of step (b) in a closed container at temperatures of from 200°F to 400°F for from 30 seconds to 5 hours; and
   d. removing the slurry of step (c) and adjusting the pH to a range of about 4.5 to about 8.0 with a basic material selected from the group consisting of sodium hydroxide, potassium hydroxide, or calcium hydroxide; and
   e. separating the liquid phase of step (d) and diluting said liquid phase with water to within the range of about 1 part concentrate to 10 parts water to about 1 part concentrate to 100 parts water; and
   f. adding the dilute liquid phase of step (e) to meat analogs in concentrations of from 1.0 to 5.0 percent.

2. A process of preparing a flavoring concentrate comprising:
   a. forming a slurry of a comminuted annimal or vegetable protein in an aqueous solution of ascorbic acid, said solution comprising from 0.1 to 2 percent, by weight of the wet natural protein, of ascorbic acid;
   b. heating the slurry of step (a) in a closed container at an elevated temperature for a period of time sufficient to insure completion of all cooking and browning reactions in said protein; and
   c. separating the liquid phase of the slurry resulting from step (b) to provide a meat flavor concentrate.

3. The process of claim 2 wherein said elevated temperature is in the range from about 200°F to 400°F.

4. The process of claim 2 wherein said slurry is heated for a period from about 30 seconds to about 5 hours.

5. The process of claim 4 wherein said slurry is heated at a temperature in the range from 250°F to 350°F.

6. The process of claim 5 wherein the protein is represented by natural raw meat.

7. The process of claim 6 wherein, in addition, the pH of the heated slurry is adjusted to within the range from about 5 to about 7.

8. The process of claim 7 wherein the ascorbic acid is present in an amount from 0.3 to 1 percent.

9. The process of claim 8 wherein the slurry comprises up to about 5 parts of water per part of protein.

10. The process of claim 9 wherein the pH is adjusted with an agent selected from the group consisting of food grade sodium hydroxide, food grade potassium hydroxide, and food grade calcium hydroxide.

* * * * *